United States Patent [19]

Bergmann et al.

[11] 4,414,552

[45] Nov. 8, 1983

[54] PRINTING HEAD FOR INK JET PRINTERS

[75] Inventors: Udo Bergmann, Schwarzenbek; Heinrich Kurz, Pinneberg; Wolfgang Radtke, Scharbeutz, all of Fed. Rep. of Germany

[73] Assignee: U.S. Philips Corporation, New York, N.Y.

[21] Appl. No.: 345,276

[22] Filed: Feb. 3, 1982

[30] Foreign Application Priority Data

Feb. 6, 1981 [DE] Fed. Rep. of Germany ....... 3104077

[51] Int. Cl.$^3$ ........................ G01D 9/00; G01D 15/16

[52] U.S. Cl. ................................ 346/1.1; 346/140 R

[58] Field of Search ........................... 346/1.1, 140, 75

[56] References Cited

U.S. PATENT DOCUMENTS 4,047,186 9/1977 Kendall et al. ................. 346/140 IJ
4,124,853 11/1978 Kattner et al. ............... 346/140 PD
4,158,847 6/1979 Heinzl et al. ................. 346/140 PD
4,356,499 10/1982 Kodama ..................... 346/140 IJ X

FOREIGN PATENT DOCUMENTS 54-148533 11/1979 Japan ............................. 346/140 R

*Primary Examiner*—Donald A. Griffin
*Attorney, Agent, or Firm*—Robert S. Smith

[57] ABSTRACT

The printing head of an ink jet printer includes several tubular nozzle ducts which have the same cross-section and on each of which there is arranged a cylindrical drive member. Each nozzle duct is constructed to be integral with its ejection nozzle and the damping member at its rear, and opens perpendicularly into the distribution duct via which the ink is applied to all nozzle ducts. At the area between the drive members and the nozzles, the nozzle ducts are bent, such that they extend parallel to one another in the other zones, the distances at the area of the nozzles being determined by the distance required between the ink droplets which are mosaic-wise deposited on the record carrier and at the rear area by the dimensions of the drive members.

10 Claims, 5 Drawing Figures

PRINTING HEAD FOR INK JET PRINTERS

BACKGROUND OF THE INVENTION

1. Field of the Invention

The invention relates to a printing head for ink jet printers, comprising a plurality of tubular nozzle ducts, each of which has associated with it a drive member for the droplet-wise ejection of ink droplets at appropriate instants, the ink being applied thereto via a common distribution duct and individually associated damping members, the nozzle ducts with their drive members being accommodated in a first block and the common distribution duct being accommodated in a second block, said blocks being preferably made of a plastic material and being interconnected.

2. Description of the Prior Art

A printing head of this kind is known, for example, from DE-OS No. 26 59 398 and comprises several ducts and drive members in order to form an ink jet printing mechanism for the printing of characters in the form of a matrix of ink droplets. Such printing heads essentially consist of two plastics blocks. In a first plastics block the tubular nozzle ducts and their drive members are encapsulated. The ducts are encapsulated as straight ducts in a fan-like pattern and their front ends open into a separate nozzle plate in which the nozzles are arranged to be parallel with respect to one another. Moreover, each duct is formed so that at the area of the cylindrical drive members it is cylindrical with a comparatively large diameter. The geometrical arrangement of the nozzles in the nozzle plate is such that the distance between the nozzles satisfies the requirements imposed by the matrix-wise composition of the characters to be printed. For example, when the character has a height of 3.2 mm, the center-to-center distance of the nozzles amounts to 0.53 mm in the case of six nozzles. In order to satisfy this requirement, the nozzle ducts must be conical in the zone between the drive members and the nozzles. This means a higher expenditure as regards work and materials. The second plastics block contains a bowl-shaped recess in which the fluid is introduced. The two plastics blocks are interconnected at their edges. Between the plastics blocks there is arranged a further plate in which there are provided damping ducts (chokes) whose cross-section is smaller than the cross-section of the nozzle ducts and which are arranged parallel with respect to one another.

The known compact units impose very high requirements as regards their manufacture. In spite of the high manufacturing precision of the individual parts, mutual displacement in the transitional zones between the pressure duct and nozzle element and/or between the plate for the damping of the fluid and the duct during assembly cannot be precluded. This fact may have a significant adverse effect on the emission of droplets and may even cause failure of the printing head.

It is difficult to fill the known system with fluid without gas bubbles being trapped at the transitional zones. Any mutual displacement between the pressure duct and the nozzle element increases the risk of inclusion of gas bubbles, not only when the fluid is introduced for the first time, but also during operation because, for example, the fluid can flow back into the interior of the system due to shocks and air bubbles are trapped at critical areas as the fluid is accelerated. Any displacement between the pressure channel and the nozzle element, moreover, will in any case affect the transmission of pressure and cause pressure losses.

Furthermore, a gap is always present between the blocks with the nozzle ducts and the nozzle plate. This gap also influences the ejection of droplets and, moreover, is not constant over a prolonged period of time. For example, it changes due to thermal or chemical influences of mechanical arching. These changes necessitate operation of the system with new, correspondingly modified drive pulses after each change. This implies not only additional electronic steps, but also permanent availability of service.

Similarly, at the area of the fluid supply it is not ensured that the fluid can be supplied without problems, i.e. without gas inclusions. The addition of the extra plate with the chokes even necessitates accurate positioning thereof at this area. This again represents a critical zone of the kind already described with reference to the nozzle plate. If the cross-section of the supply bores is even smaller than that of the nozzle ducts, which is favorable in view of ejection, the described problems occurring during the filling with fluid are even greater.

SUMMARY OF THE INVENTION

It is an object of the invention to improve the filling of the printing head with ink fluid, to make the emission of droplets more reliable, and to provide a simple method of manufacturing such a printing head comprising several ducts. It is a further object of the invention to minimize the center-to-center distances of the outlet nozzles even when the nozzle ducts have a constant cross-section over their entire length. Moreover, it must be possible to test the printing head during its manufacture so that rejections are reduced without it being necessary to abandon the compact construction.

This object is achieved in that the nozzle ducts are constructed to be integral with their ejection nozzles as well as with their damping members, the nozzle ducts opening perpendicularly into the distribution duct, the nozzle ducts being bent in the zone between the drive members and the ejection nozzles such that they extend parallel to one another in the other zones, their distance at the area of the ejection nozzles being determined by the required distance between the ink droplets which are mosaic-wise deposited on the record carrier and at the rear area by the dimensions of the drive members.

Preferably, the drive members themselves remain freely accessible so that they can be adjusted at a later stage in order to ensure that all printing nozzles have the same droplet emission.

The distribution duct preferably has a tubular construction, its cross-section being larger than the cross-section of a nozzle duct. The path of the distribution duct in the separate plastics block is not critical. It may be straight or be shaped as a U therein. It is merely important that the actual supply section for the nozzle ducts extends perpendicularly thereto. The material of the nozzle ducts may also be arbitrary and is essentially governed by the compatibility with the ink fluid used and with the material used for the plastic block. Glass nozzle ducts are particularly attractive.

The manufacture of such a printing head is also particularly simple, the manufacturing method being characterized in that each nozzle duct first obtains the predetermined shape and is provided with a drive member, after which it is tested for suitable operation and droplet emission, followed by alignment in a mount and encapsulation in a first plastic block, the first plastic block subsequently being cut at its rear to be perpendicular to the ends of the nozzle ducts and being connected to the distribution duct which is encapsulated in a second plastic block. After the assembly of the printing head and the filling of the distribution duct with fluid, the droplet emission of the individual nozzle ducts is measured and adjusted with respect to one another by trimming of the drive members. Trimming can be performed by more or less reducing one of the electrodes of the relevant drive members whose nozzle duct exhibits a droplet emission which deviates from a predetermined value until the predetermined value is obtained.

The printing head in accordance with the invention offers the advantage that during its manufacture the performance of the individual nozzle ducts with their drive members can be separately tested before encapsulation in the plastic block. Rejections of finished printing heads are thus substantially avoided. It is also possible to trim the individual drive members after the manufacture of the printing head in order to adjust all its nozzle ducts to the same properties with drive pulses which are the same for all ducts. The control electronics for the printing head may thus be simple.

In a further embodiment in accordance with the invention, the nozzle ducts have the same cross-section over their entire length, except at the areas of the damping members and the nozzles, said cross-section being comparatively small, for example 0.4 mm. The drive members are preferably actuated so that the applied voltage pulse first draws the fluid meniscus present in the nozzle into the front part of the nozzle duct, the voltage being cut off as soon as the fluid meniscus reaches its maximum value in the ejection direction. Because the fluid is thus drawn in before it is ejected, a higher starting speed of the ejected droplet is obtained. Moreover, only a small actuation voltage is required for the emission of the fluid. This is a negative actuation as opposed to the known devices where a positive actuation takes place, i.e. the fluid meniscus is moved directly in the direction of ejection.

BRIEF DESCRIPTION OF THE DRAWINGS

An embodiment in accordance with the invention will be described in detail hereinafter with reference to the drawing.

Therein.

DESCRIPTION OF THE PREFERRED EMBODIMENT

Figure 3:
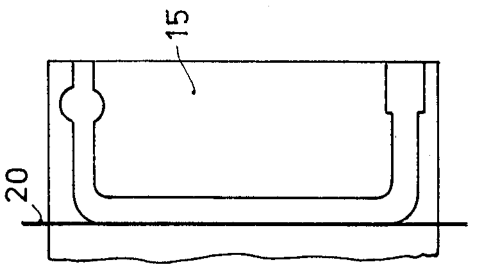
FIG. 3 shows the distribution duct in a second block.

The printing head for an ink jet printer in which the individual ink droplets are ejected from the nozzles and subsequently land on a record carrier after a free flight, (i.e. they are not deflected in an electromagnetic field) consists of a tubular nozzle duct 1 with a surrounding drive member 2. The drive member is preferably glued onto the nozzle duct. Between the drive member 2 and the ejection nozzle 3 each nozzle duct 1 is deflected or bent so that it extends parallel to the neighboring nozzle ducts of the printing head outside this zone, the center-to-center distance of the nozzles being determined in the front zone by the distance required between the ink droplets deposited mosaic-wise on the record carrier, for example, 0.53 mm, and in the rear zone by the dimensions of the drive members 2. At the rear of the nozzle duct 1 there is formed a constriction which serves as an integral damping facility 4 for the fluid fluctuations.

With the exception of the ejection nozzle 3 and the damping member 4, the cross-section of the nozzle duct is the same over its entire length and amounts to, for example, 0.4 mm. Such a comparatively small cross-section enables the assembly of several nozzle ducts to form a printing head which consists of, for example, six nozzles which are arranged one over the other or of a nozzle matrix, the center-to-center distance of the nozzles which are arranged one over the other then amounting to 0.53 mm when the height of the character on the record carrier is 3.2 mm. The constant cross-section offers improved control of the fluid ejection by the drive members.

Figure 1:
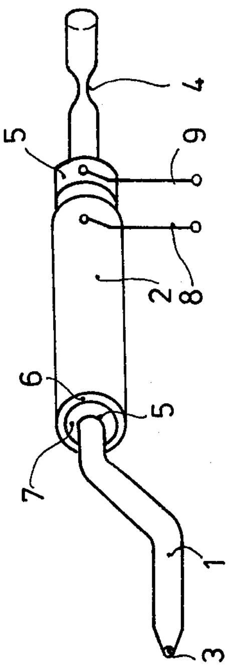
FIG. 1 shows a preassembled complete nozzle duct.

The drive member 2 acts as an electromechanical transducer and is constructed notably as a piezoelectric transducer. It consists of an inner electrode 5 which is arranged directly on the outer surface of the nozzle duct 1, an outer electrode 6, and a piezo-electric element 7 which is arranged therebetween. The inner electrode 5 is pulled at one end around the front of the piezoelectric element 7 and rests on the outer surface thereof and is separated from the outer electrode 6 by a gap which is not electrically conductive. As a result, a simple connection of the connection wires 8 and 9 is obtained. The element shown in FIG. 1 is an operational droplet generator and its operation can already be tested, if desired, before assembly with similar droplet generators. As a result, the rejections of printing heads can be minimized.

Several of such nozzle ducts 1 are assembled to form a module in which, for example, six accurately bent nozzle ducts 1 are permanently accommodated in a block 10, together with their drive members 2, outlet nozzles 3 and damping members 4. For the embodiment shown in FIG. 2, this can be achieved, for example, by means of a moulding resin. The drive members 2 themselves are not encapsulated in order to maintain free access thereto, to ensure that their movements cannot be impeded by moulding resin, and to separate them mechanically from one another. If it is decided, however, to encapsulate the drive members also in the plastic block 10, the modification to be described hereinafter and the advantages thereof must be dispensed with. The assembly of the nozzle ducts to form a module can be executed in a manner so that the ejection nozzles 3 which are situated at a predetermined distance from one another and the side of the ducts which is opposite the ejection nozzles at the area of the damping components 4 are taken together. At the latter area the nozzle ducts 1 are preferably encapsulated in a wider zone than were necessary for the finished module.

The encapsulation of the individual nozzle ducts is performed in a mould. The fixation at the area of the ejection nozzles 3 can be obtained in known manner by means of a mount 12 or a perforated plate which provides the necessary distance between the nozzles. The mount 12 is encapsulated together with the individual nozzle ducts 1. On the other side, the nozzle ducts 1 are arranged in a divisible mount of the mould (not shown) so that the drive members 2 are situated in the recess 14 formed by the mount, the nozzle ducts projecting from the recess 14 at both sides. The passages in the mould for the nozzle ducts 1 must be tight in order to ensure that moulding resin cannot reach the drive members 2. The nozzle ducts 1 which are thus fixed at the areas of the ejection nozzles 3 and the drive members 2 are subsequently arranged in a mould (not shown) which determines the shape of the module, it being ensured that no moulding resin can penetrate into the interior of the nozzle ducts 1. This can be achieved in known manner by means of flexible sealing materials, for example, silicon rubber.

Figure 2:
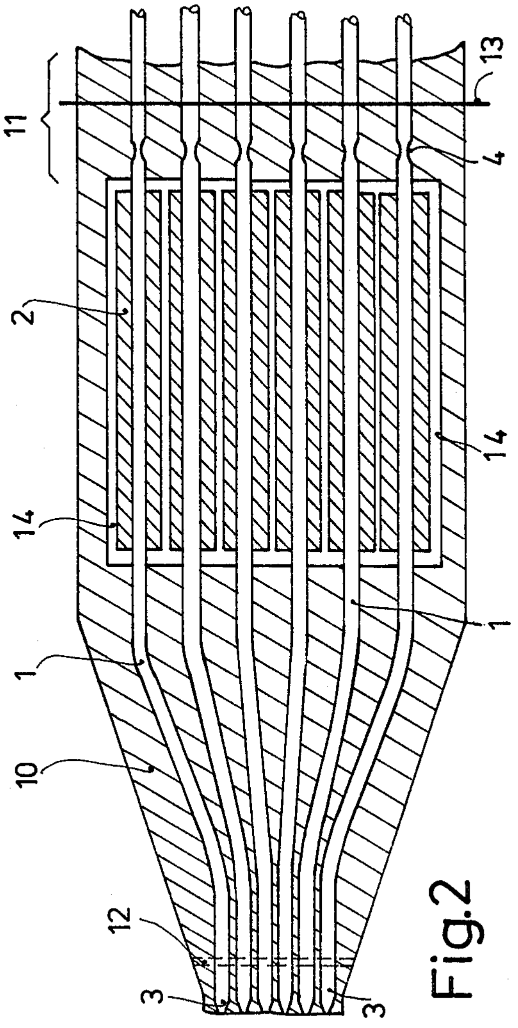
FIG. 2 shows the assembly of several ducts of FIG. 1 in order to form a first block.

The filling of the mould thus prepared is a known process. A rough module is then obtained as shown in FIG. 2. This module is cut to the desired length along the line 13 at the area 11 during a simple operation, so that a flat surface perpendicular to the nozzle ducts 1 is obtained.

The mould may alternatively be formed so that it terminates already at the cut 13. However, because shrinkage tolerances cannot be precluded, there is a risk that the edge is not flat and that the ends of the nozzle ducts project slightly from this surface. However, as will be described in detail hereinafter, this surface must be tight with respect to the distribution duct.

The tubular distribution duct is formed during a separate operation (FIG. 3). To this end, a U-shaped duct 16 is formed in a plastics block 15, for example, by encapsulation of a correspondingly shaped wire which is subsequently removed by etching, or in a suitable other manner. At the side of the connection piece, the mould is again slightly larger. Subsequently, the correct shape is imparted to the plastics block 15 along the cut line 20 at the area of this connection. The line 20 should be situated so that the connection piece of the distribution duct is open towards the exterior. The cross-section of the distribution duct is larger, at least at the area of the connection piece, than the cross-section of the individual nozzle ducts 1 and extends perpendicularly thereto.

Figure 4:
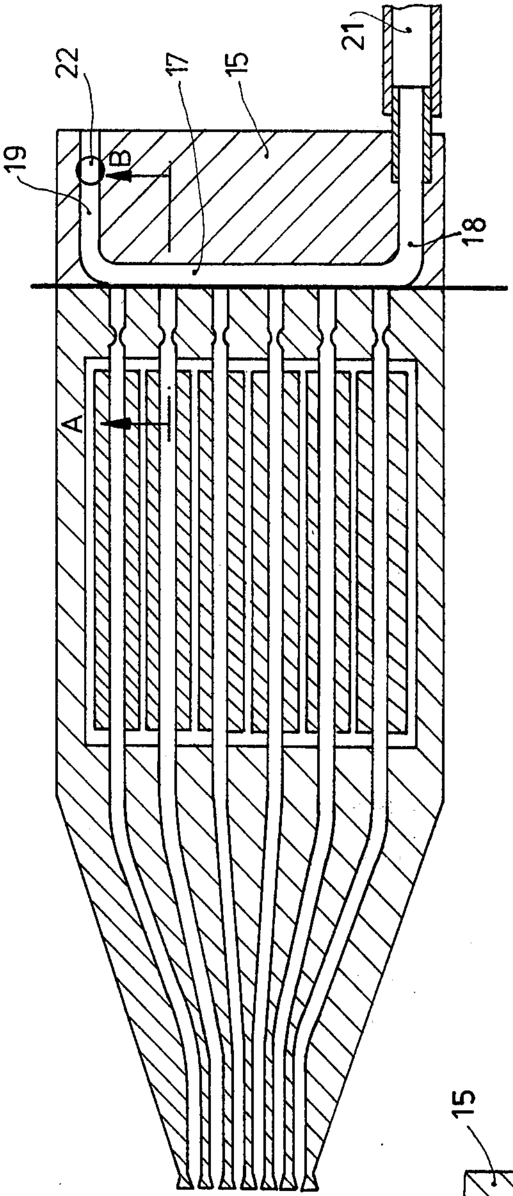
FIG. 4 shows the complete printing head with nozzle ducts and distribution duct.
Figure 5:
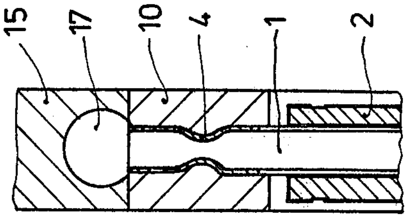
FIG. 5 is a cross-sectional view taken along the line AB in FIG. 4.

The two modules according to the FIGS. 2 and 3 are coupled by way of their cut sides. The distribution duct thus forms an integral fluid supply system for the nozzle ducts, because there is no specific assignment of bores to specific ducts. The complete printing head is shown in FIG. 4. The U shaped duct 16 consists of the connection piece 17 as the actual distribution duct and the legs 18 and 19. The supply duct 21 for the printing fluid is connected to the leg 18. The leg 19 contains the venting device 22. This module already represents a simple printing head enabling mosaic-wise composition of the character.

The printing head allows the fluid to be replenished in a simple manner, without inclusion of gas bubbles. This is achieved in that there are no disturbing edges in the path of the fluid.

Alternative to the described embodiment, the ink can also be supplied so that the distribution duct 17 is rectilinearly passed out of the block 15 at the top and the bottom.

The drive members 2 of the finished printing head described are freely accessible. When each drive member 2 is provided with a facility for trimming, the entire printing head, i.e. all its nozzle ducts 1, can be adjusted for the same properties with drive pulses which are the same for all ducts. When piezoelectric transducers are used, this can be simply achieved by the partial removal by burning or etching of one of the electrodes 5 or 6. The efficiency of the individual drive members can thus be adjusted so that the reaction of all nozzle ducts 1 to the same drive pulse is the same .

The module can be manufactured as a plate-like member. When several of such modules are stacked and the ejection nozzles 3 of one module are suitably arranged to be staggered with respect to the others, multiple printing heads comprising numerous simultaneously operating droplet generators can be manufactured to enable formation of a plurality of matrix patterns which are determined by the arrangement of the outlet nozzles.

What is claimed is:

1. A printing head for ink jet printers, comprising a plurality of tubular nozzle ducts, each of which has associated with it a drive member for the droplet-wise ejection of ink droplets at appropriate instants, the ink being applied thereto via a common distribution duct and individually associated damping members, each nozzle duct with its drive member forming a separate, operational droplet generator, the droplet generators being accommodated in a first block and the common distribution duct being accommodated in a second block, said blocks being preferably made of a plastic material, and being interconnected, characterized in that:

- the nozzle ducts (1) are constructed to be integral with their ejection nozzles (3) as well as with their damping members (4);
- the nozzle ducts (1) opening perpendicularly into the distribution duct (17);
- the nozzle ducts being bent in the zone between the drive members (2) and the ejection nozzles (3) such that they extend parallel to one another in the other zones;
- their distance at the area of the ejection nozzles (3) being determined by the required distance between the ink droplets which are mosaic-wise deposited on the record carrier and at the rear area by the dimensions of the drive members (2).

2. A printing head as claimed in claim 1, characterized in that the drive members (2) of the nozzle ducts (1) are arranged to be freely accessible in a recess (14) in the first block (10).

3. A printing head as claimed in the claim 1 or 2, characterized in that the drive members (2) have a tubular construction and are glued onto the nozzle ducts (1).

4. A printing head as claimed in any one of claims 1 to 3, characterized in that the drive members (2) are arranged to extend parallel to one another.

5. A printing head as claimed in any one of claims 1 to 3, characterized in that the cross-section of a nozzle duct (1) is the same over its entire length with the exception of the area of the damping member (4) and the outlet nozzle (3).

6. A printing head as claimed in any one of claims 1 to 3, characterized in that the distribution duct (17) is constructed to be tubular, its cross-section being larger than the cross-section of a nozzle duct (1).

7. A printing head as claimed in claim 6, characterized in that the distribution duct (17) is constructed to be U-shaped, one leg (18) serving as a supply duct for the fluid, the connection piece (17) serving as the actual supply duct, while the other leg (19) serves as a venting duct.

8. A method of manufacturing a printing head for ink jet printers, comprising a plurality of tubular nozzle ducts, each of which has associated with it a drive member for the droplet-wise ejection of ink droplets at appropriate instants, the ink being applied thereto via a common distribution duct and individually associated damping members, each nozzle duct with its drive member forming a separate, operational droplet generator, the droplet generators being accommodated in a first block and the common distribution duct being accommodated in a second block, said blocks being preferably made of a plastic material, and being interconnected, comprising the steps of:

obtaining the predetermined shape for each nozzle duct (1) and providing it with a drive member (2);

testing each nozzle duct for suitable operation and droplet emission;

aligning each nozzle duct in a mount (12) and encapsulating it in a first plastic block (10); cutting the first plastic block (10) at its rear to be perpendicular to the ends of the nozzle ducts (1); and connecting it to the distribution duct (17) which is encapsulated in a second plastic block (15).

9. A method as claimed in claim 8, characterized in that after the assembly of the printing head and the filling of the distribution duct with fluid, measuring the droplet emission of the individual nozzle ducts and matching said ducts by the trimming of drive members.

10. A method as claimed in claim 9, characterized in that the trimming of the drive members is performed by more or less reducing one of the electrodes of the relevant drive members whose nozzle duct exhibits a droplet emission which deviates from a predetermined value until the predetermined value is obtained.

* * * * *